United States Patent
Wu

(10) Patent No.: US 7,907,663 B1
(45) Date of Patent: Mar. 15, 2011

(54) MULTI-USER EQUALIZATION METHOD AND DEVICE FOR WIRELESS COMMUNICATION SYSTEM

(75) Inventor: Fan Wu, Shanghai (CN)

(73) Assignee: ST-Ericsson SA, Geneva (CH)

( * ) Notice: Subject to any disclaimer, the term of this patent is extended or adjusted under 35 U.S.C. 154(b) by 273 days.

(21) Appl. No.: 11/910,833

(22) PCT Filed: Apr. 4, 2006

(86) PCT No.: PCT/IB2006/051009
§ 371 (c)(1), (2), (4) Date: Jan. 2, 2009

(87) PCT Pub. No.: WO2006/106473
PCT Pub. Date: Oct. 12, 2006

(30) Foreign Application Priority Data

Apr. 6, 2005 (CN) .......................... 2005 1 0063308

(51) Int. Cl.
*H03H 7/40* (2006.01)
*H04B 1/10* (2006.01)
(52) U.S. Cl. ........................................ 375/231; 375/350
(58) Field of Classification Search .................. 375/148, 375/150, 229, 232, 343, 350; 370/335, 342
See application file for complete search history.

(56) References Cited

U.S. PATENT DOCUMENTS
7,158,558 B2 * 1/2007 Petre et al. ..................... 375/147
2002/0191568 A1 * 12/2002 Ghosh ........................... 370/335

FOREIGN PATENT DOCUMENTS
WO   WO 2004/112279 A1   12/2004

* cited by examiner

*Primary Examiner* — Khanh C Tran

(57) ABSTRACT

In certain embodiments, an equalization device for a wireless communication receiver includes multiple adjusting means coupled between corresponding multiple weighting means and a combining means. The multiple weighting means performs a weight process on a received multipath signal to obtain multiple weight results, respectively, according to a plurality of adjustable weight coefficients. The multipath signal includes a known training sequence and user data that may both experience channel fading. The adjusting means compares the weight results of the known training sequence with respective multiple known reference signals, and respectively adjusts the weight coefficient of each weighting means by utilizing the comparison results so that the weighting means weight the user data by utilizing the adjusted weight coefficient. The combining means combines the weight results of the user data to obtain a combined equalization signal. Certain embodiments of the equalization device may be implemented on a mobile terminal to mitigate the effects of wireless channel fading.

19 Claims, 3 Drawing Sheets

MULTI-USER EQUALIZATION METHOD AND DEVICE FOR WIRELESS COMMUNICATION SYSTEM

FIELD OF THE INVENTION

The present invention relates to a wireless communication system, and more particularly, to an adaptive multi-user equalization method and device for use in a receiver of the wireless communication system.

BACKGROUND OF THE INVENTION

Wireless signals are usually blocked by barriers in the path of propagation, which leads to reflection, dispersion, attenuation and the like. In turn, the multipath effect is produced, so that signals received at antenna of a receiver are actually a linear superposition of multipath signals arriving from different paths, and those multipath signals from various paths are difference in delays, amplitudes, phases and frequencies. On the other hand, for a wireless communication system adopting code division multiple access (CDMA) technology, since the wireless interface uses different channellisation codes to differentiate users, multiple users can share the same frequency and slot resources. Theoretically, orthogonal channellisation codes can not only differentiate different users but also minimize the interference among multiple users. However, due to the limitation of multipath effect, spreading gain and system synchronization accuracy, the complete orthogonality between multiple user data is hardly to be ensured, and multiple access interference (MAI) and inter-symbol interference (ISI) are inevitably caused, system capacity and communication quality will be impaired accordingly. Thus, how to suppress MAI and ISI has drawn a wide range of attention from both academic and industrial circles.

At present, the main approaches to suppress MAI and ISI are multi-user detection (MUD) and multi-user equalizer (MUE), both of which play important roles in improving bit error rate (BER) performance and increasing system capacity. Unlike a conventional receiver that contains a matched filter only, an MUD or MUE receiver makes full use of the information from all users, even from the interferers, to suppress MAI and ISI.

One of the effective methods to eliminate the aforesaid interference is to perform joint detection on the obtained information after a matched filter. The joint detection is an ideal multi-user detection to extract all user data in parallel.

In general, the receiver estimates channel parameters using specific training sequences in various communication bursts. Also, the receiver extracts in parallel all user data, which share the same slot and frequency, by using a specific algorithm, removes the interference caused by non-target user data, and lastly obtains a target signal that has a high signal-to-noise ratio.

The method of joint detection increases the allowable range of signal fluctuation, and makes it possible to share resources by more users. Consequently, the transmission capacity of each carrier bandwidth is enhanced effectively and the spectrum efficiency is improved. However, the method of joint detection, though having many advantages, encounters a number of limitations in practice because of its high complexity and poor real time performance.

As the most universal method with low computational complexity, adaptive multi-user detection is an alternative for the current RAKE receiver in place of joint detection. Since the method does not need to extract all user data in parallel, it is much simpler than the method of joint detection.

FIG. 1 illustrates a conventional multi-user equalizer using a least-mean-square (LMS) method. This method obtains adjusted weighting parameters, which are used to weight and despread user data, by training a despread training sequence. The operation process of the equalizer consists of two stages, i.e. a training stage and a despreading stage. Hereinafter, the training stage will be described first.

In FIG. 1, x[n] denotes a received signal based on the chip rate. In the training stage, the signal is a set of known spread training sequences. Having been transmitted through different paths, the signal x[n] has different delays corresponding to each path respectively. Having been weighted by weighting modules 12-1, 12-2, ..., 12-K, the received training signal gets bit-rate-based training sequence signals, wherein $W_k^*$ denotes a weight vector whose dimensionality equals the spreading factor, and specifically, it is a weight vector processing the $k^{th}$ propagation path. Then, K weight vectors, $W_k^H$ (k=1, 2, ..., K), form a weight matrix $W^H = [w_1^H | w_2^H | ... w_K^H]$ The weighted training signals are summed by an adder 131 to obtain bit-rate-based despread training sequence d'[m], wherein m denotes the times the weight vector has been adjusted, and d[m] denotes a known reference training signal for a target user. An adder 132 adds d'[m] and −d[m] to obtain their difference e[m]. The difference e[m] is fed back to computing means 133 to adjust the weight coefficient $W_k^*$. The adjusted weight coefficient $W_k^*$ is applied to each of the corresponding weighting modules 12-1, 12-2, ..., 12-K. After times of feedback adjusting, a proper weight coefficient is obtained, which is used to perform a weight process on user data of multipath transmission. Hereinafter, the above process will be described in conjunction with mathematical expressions.

Suppose the received data x[n] is over-sampled with the over-sampling rate SF to obtain the vector X, and then:

$$X_n^T = [x_1^T | x_2^T | ... x_K^T]_n \quad (1)$$

Here, $X_n^T$ is a chip-rate-based training sequence through channel fading and sampling.

Through weighting by weight modules 12-1, 12-2, ..., 12-K and summing by the adder 131, a chip-rate-based output signal d'[m] is obtained:

$$d'[m] = W^H X_m \quad (2)$$

The error between the output signal d'[m] and the known reference signal d[m] is:

$$e[m] = d'[m] - d[m] \quad (3)$$

The computing means 133 decides whether to finish the adjustment on the weight coefficient, and computes the adjusted weight coefficient according to the last computation results if the adjustment on the weight coefficient is not finished. There are two methods for judging whether to finish the adjustment on the weight coefficient. One method is to compute the LMS function as shown in equation (4):

$$\min_w \{E|e[m]^2\} = \min_w \{E[(d'[m] - d[m])(d'[m] - d[m])^*]\} \quad (4)$$

It is determined whether to finish the adjustment on the weight coefficient by deciding whether result of the objective function is smaller than a predetermined threshold.

The other method is to, during adjusting the weight coefficient by using a training sequence of a finite length, determine whether to finish the adjustment on the weight coefficient by deciding whether the training sequence is finished.

For instance, the weight coefficient is adjusted based on the recursive discipline for the weight vector from step m to step m+1 by equation (5):

$$W_{m+1}{}^H = W_m{}^H + 2\mu e^*[m]X_m = W_m{}^H + 2\mu(d'[m] - d[m])^* X_m \quad (5)$$

wherein μ denotes the step of the recursive operation.

For a more accurate prediction and a faster convergence speed, a normalized least mean square (NMLS) method can be used. This is an improved LMS method, in which the increment of equation (5) is normalized to obtain the following equation:

$$W_{m+1}^H = W_m^H + \frac{2\mu e^*[m]X_m}{X_m^H X_m} = W_m^H + 2\mu \frac{(d'[m] - d[m])^* X_m}{X_m^H X_m} \quad (6)$$

The above training step is performed recursively until the adjustment is decided to be finished by one of the above two methods. The weight coefficient obtained therefrom can be used to suppress MAI and ISI and recover the original user data successfully.

After the training stage is finished, it goes to the despreading stage, in which the despread data are obtained by weight-summing the multipath user data using the weight coefficient obtained in the training stage. Herein, $X_n^T$ of equation (1) is the user data experiencing channel fading, and d'[m] of equation (2) is the despread user data. The despread data can be directly output from the adder 131 for use with a subsequent process in the receiver.

Since the above-described training method is a method for adjusting a weight coefficient based on the chip rate and the speed of parameter adjustment is limited by the feedback period, it is not suitable for a communication system that sets much higher requirements on real time.

Therefore, there is a need for a new method and device capable of fast adjusting a weight coefficient so as to meet the higher requirements of a system on real time.

SUMMARY OF THE INVENTION

In order to settle the above-mentioned technical problem, the present invention provides an adaptive multi-user equalization device and method for a receiver of a wireless communication system, and a computer program implementing the method, and in particular, a chip-rate-based adaptive multi-user equalization device and method, and a computer program implementing the method.

An object of the present invention is to provide an adaptive multi-user equalization device, method and program capable of fast adjusting weight coefficients of all communication paths.

Another object of the present invention is to provide an adaptive multi-user equalization device, method and program capable of obtaining more accurate weight coefficients.

In order to achieve part or all of the above objects, according to one aspect of the present invention, there is provided an equalization device for a wireless communication receiver, which comprises: a plurality of weighing means for, according to a plurality of adjustable weight coefficients, respectively performing a weight process on received multipath signals to obtain a plurality of weight results, said multipath signals including known training sequences and user data experiencing channel fading; a plurality of adjusting means for comparing said plurality of weight results of said training sequence, which are output by said plurality of weighting means, with a plurality of known reference signals respectively, and respectively adjusting the weight coefficient of each of the weighting means in accordance with the comparison results so that said weighting means can weight said user data by utilizing the adjusted weight coefficient; and combining means for combining the plurality of weight results of said user data, which are output by said plurality of weighting means, to obtain the combined equalization signal.

According to one aspect of the present invention, there is provided an equalization method for using in a wireless communication receiver, which comprising the steps of: a) according to a plurality of adjustable weight coefficients, respectively performing a weight process on known training sequences in received multipath signals experiencing channel fading to obtain a plurality of weight results of the training sequences; b) comparing said plurality of weight results of said training sequence with a plurality of known reference signals respectively, and respectively adjusting each of the weight coefficients in accordance with the comparison results; c) according to the plurality of weight coefficients obtained from adjustment, performing a weight process on user data in said received multipath signals experiencing channel fading to obtain a plurality of weight results of the user data; and d) combining the plurality of weight results of said user data to obtain the combined equalization signal.

According to a further aspect of the present invention, there is provided a mobile terminal, which comprises: a reception device for receiving a signal through wireless channel fading; an equalization device for performing a chip-rate-based signal equalization on said received signal to obtain user data for use in despreading and equalization; and a despread device for despreading said equalized user data.

Compared with conventional bit-rate-based equalization methods and devices, the present application is able to fast adjust the weight coefficient of each communication path and obtain more accurate weight coefficients.

Other objects and effects of the present invention will become more apparent and ready to understand from the following description taken in conjunction with the accompanying drawings, contents in the claims, and with a more comprehensive understanding of the present invention

BRIEF DESCRIPTION OF THE DRAWINGS

Hereinafter, the preferred embodiments of the present invention will be described with reference to the accompanying drawings in which.

In all the accompanying drawings, identical numerals represent like or corresponding features or functions.

DETAILED DESCRIPTION OF THE INVENTION

The basic discipline of the present invention is to adjust weight coefficients based on the chip rate, i.e., the adjustment period of weight coefficients is the chip period. Since a bit is formed by SF (spreading factor) chips and the chip rate is SF times as large as the bit rate, the convergence speed of a method of adjusting weight coefficients based on the chip rate is much faster than that of a conventional bit-rate-based method.

The present invention adjusts weight coefficients by directly comparing weighted signals with reference signals, thereby shortening the adjustment period greatly.

The principle of the present invention will be described with reference to FIG. 2 below.

Figure 1:
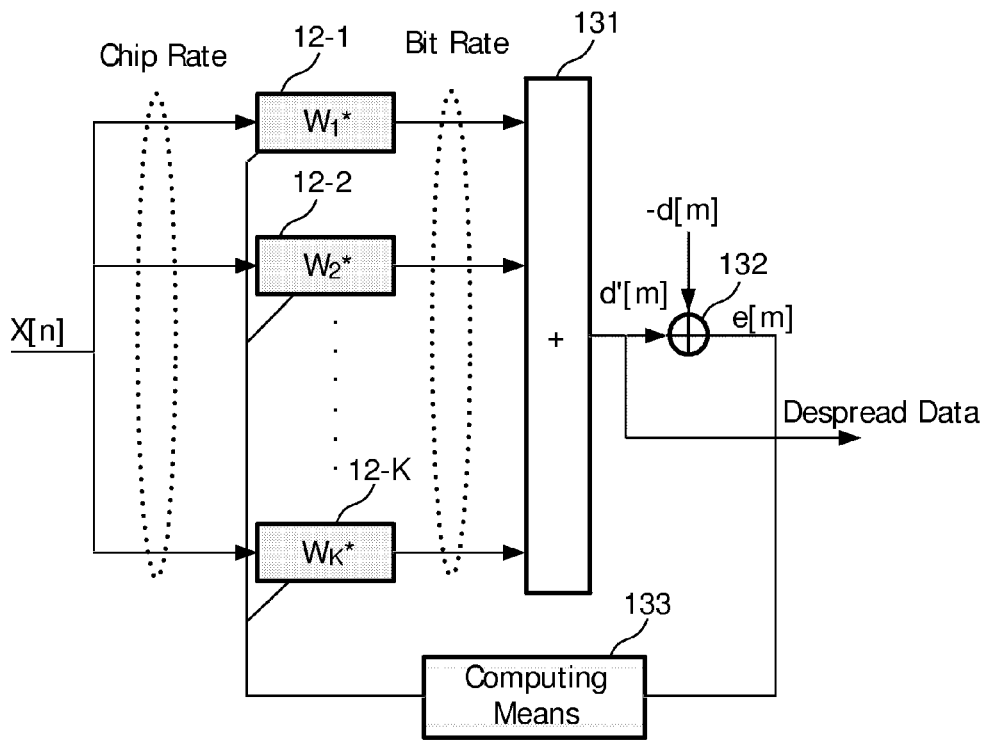
FIG. 1 illustrates a schematic view of a conventional equalizer.
Figure 2:
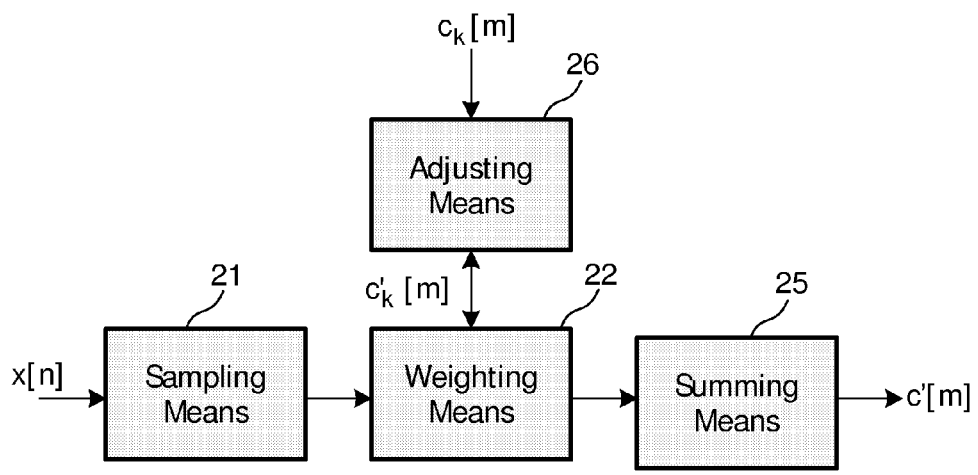
FIG. 2 illustrates a block diagram of a multi-user equalizer according to an embodiment of the present invention.

FIG. 2 shows a block diagram of a multi-user equalizer according to an embodiment of the present invention. Said equalizer comprises: sampling means 21, weighting means 22, adjusting means 26 and summing means 25.

In FIG. 2, the operation of the device is divided into two stages, a training stage of weight coefficients and a chip-equalizing stage. First, the training stage of weight coefficients will be described below.

During the training stage of weight coefficients, the received signal x[n] is a known training signal. The sampling means 21 performs a multiple sample on the received signal x[n]. The sampled training signal is transferred to and weighted by the weighting means 22 to obtain a training sequence $c'_k[m]$ which represents a training sequence through channel fading and obtained via the $k^{th}$ transmission path. Then, the adjusting means 26 compares the received training sequence $c'_k[m]$ with a known reference sequence $c_k[m]$, adjusts weight coefficients recursively, determines whether to finish the training process based on whether the difference between the received training sequence $c'_k[m]$ and the known training sequence $c_k[m]$ meets predetermined conditions or whether the training sequence $c'_k[m]$ is finished, and obtains proper weight coefficients.

Upon completion of the training, the chip equalization is performed using the weight coefficients obtained in the training process. Herein, x[n] is the received user data. The sampling means 21 performs a multiple sample on the received user data x[n]. The sampled signal is transferred to the weighting means 22. The weighting means 22 performs a weight process on the received user data using the proper weight coefficients determined at the training stage. And the summing means 25 sums the user data, which come from all paths and have gone through the weight process, to obtain a multiuser equalized signal c'[m] for use in a subsequent despeading process.

Figure 3:
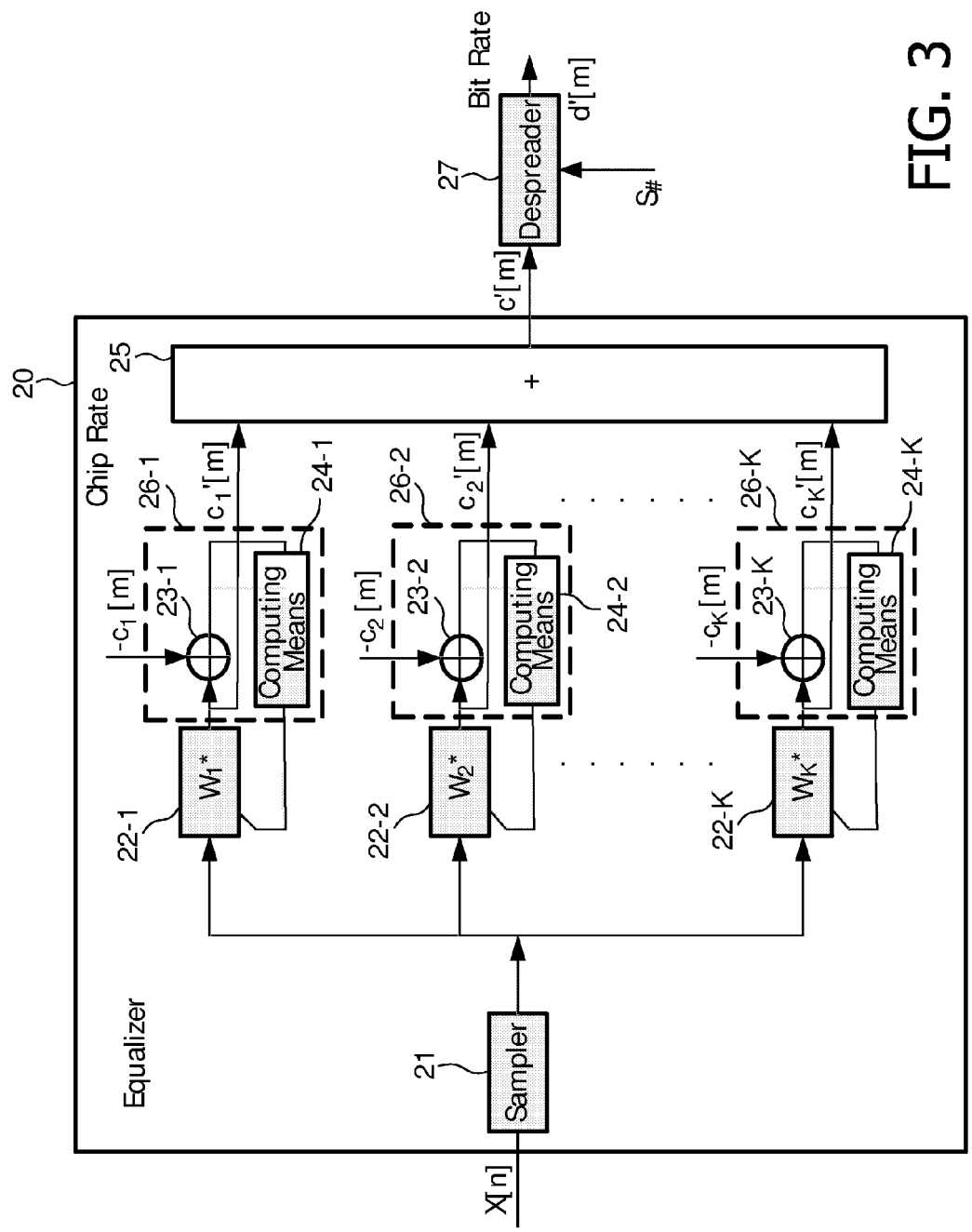
FIG. 3 illustrates a schematic view of a receiver comprising an equalizer according to an embodiment of the present invention.

FIG. 3 shows a schematic view of a receiver comprising an equalizer according to an embodiment of the present invention.

In FIG. 3, the receiver comprises an equalizer 20 and a despreader 27, wherein the equalizer 20 comprises a sampler 21, a plurality of parallel weighters 22-1, 22-2, . . . , 22-K, a plurality of adders 23-1, 23-2, . . . , 23-K, a plurality of computing means 24-1, 24-2, . . . , 24-K, and an adder 25. In the equalizer 20, one adder 23-$k$ and one computing means 24-$k$ form one adjusting means 26-$k$, wherein k=1, 2, . . . , K. K adjusting means form the adjusting means in FIG. 2. The weighters 22-1, 22-2, . . . , 22-K in FIG. 3 correspond to the weighting means 22 in FIG. 2. The operation of the receiver shown in FIG. 3 is also divided into two stages, namely a training stage and a chip-equalizing stage. First, the training stage will be described below.

In the training stage, the received signal x[n] is a training sequence. First, the sampler 21 performs an over-sampling on the training sequence x[n], such as a multiple sample to sample plural points of each chip in the received signal. Take a sample multiple equaling i for example. Then, the sampled signal can be expressed as $X^{1/i}=[x_1, x_2, \ldots, x_i]$, and an estimate signal component in the $k^{th}$ path is obtained through weight-summing by the weighters 22-1, 22-2, . . . , 22-K:

$$c_k' = W_k^H X^{1/i} \quad (7)$$

Here, Wk is the weight coefficient with dimension of 1 by i for the $k^{th}$ path.

The sampler 21 in FIG. 3 is not a necessary device, and the object of the present invention can be achieved even if the device is omitted. In addition, the sample multiple i of the sampler 21 may be any integer multiple, such as 2 and 4. The larger the sample multiple is, the higher accuracy of the adjustment is, while the higher complexity is. Thus, it is preferable to adopt the sample multiple of 8.

In the adder 25, the path signal components $c_1'[m], c_2'[m], \ldots, c_K'[m]$ output from the weighters 22-1, 22-2, . . . , 22-K are summed to obtain a gross estimate output, namely a chip-rate-based signal:

$$c'[m] = \sum_{k=1}^{K} c_k'[m] \quad (8)$$

At the adders 23-1, 23-2, . . . , 23-K, the estimate value $c_k'[m]$ for each path is compared with the reference signal $c_k[m]$ for each path to obtain the difference between $c_k'[m]$ and $c_k[m]$. The above reference signal for each path can be computed through the following equation:

$$c_k[m]=P_k \cdot \{\text{Midamble}\}, k=1, 2, \ldots K \quad (9)$$

In the equation (9), $P_k$ is channel parameters used for each adjusting means and representing different signal paths, and {Midamble} is a known training sequence code.

Whether to finish the training stage is decided by one of the following two methods.

One method is to input the comparison results output from the adders 23-1, 23-2, . . . , 23-K into the computing means 24-1, 24-2, . . . , 24-K. In each of the computing means 24-2, 24-2, . . . , 24-K, it is decided whether the objective function of the aforesaid difference meets a predetermined standard, for example, it is decided whether it is smaller than a predetermined threshold. If the objective function does not meet the predetermined standard, then the weight coefficient is recursively adjusted in accordance with the adjustment equation until the objective function meets the predetermined standard. For instance, the aforesaid objective function may be the Least-Mean-Square function:

$$\underset{w}{\text{Min}}\{E|e_k[m]|^2\} = \underset{w}{\text{Min}}\{E[(c_k'[m] - c[m])(c_k'[m] - c[m])^*]\} \quad (10)$$

wherein m denotes the times the current weight coefficient is adjusted.

The other method of deciding whether to finish the training stage is to decide whether to finish the training stage by deciding whether the training sequence is finished in the computing means 24-1, 24-2, . . . , 24-K.

The recursive adjustment equation for the $k^{th}$ path weight from step m to step m+1 is, for example, described as:

$$W_{k,m+1} = W_{k,m} + 2\mu \frac{(c_k'[m] - c[m])^* X_m^{1/8}}{X_m^{1/8H} X_m^{1/8}} \quad (11)$$

Similar to the weight adjustment equation used in the prior art, the equation (11) can also use other equation, which is capable of converging weight coefficients, to adjust the weight coefficient. Finally, after the training stage of plural recursion (chip), the ultimate weight coefficient $W_k^*$ is obtained for weighting the user data.

After the training stage is finished, the chip equalizing stage is entered. In the adders 22-1, 22-2, ..., 22-K, a weight process is performed on the received user data by using the obtained ideal weight coefficient, i.e., the received user data are equalize-compensated. Then, each component is added together, and the user data for chip equalization are obtained.

Afterwards, a despreader 27 despreads the equalized user data by using the spread code $s_\#$ of the target user to obtain the user data for ultimate output. Here, $s_\#$ is the channellisation code of the target user.

According to the TD-SCDMA standard, the pulse architecture of each service slot is formed by two data symbol areas, a 144-chip training sequence and a 16-chip protection area. In each slot, when receiving a training sequence, the weight vector is adjusted recursively using the multi-user equalizer of the present invention, and the recursive adjustment is performed once using each of the chips of the training sequence. Thus, the recursive adjustment is performed for 144 times in each slot. The weight results are not summed and output to the despreader in the process of recursively adjusting the weight vector; instead, the user data are weighted based on the adjusted weight vector and output to the despreader when it begins to receive the user data.

The method of the present invention can be combined with the existing joint detection method, i.e. the joint detection method can be applied to the data d'[m] despread by the despreader 27 to minimize the MAI and ISI.

As is clear from the above description, in the prior art, the despreading process is completed in the weighters 12-1, 12-2, ..., 12-K and the adder 131, the output signal d'[m] is the despread chip-rate-based data, and a proper weight vector is determined by comparing the despread data with the reference data. However, the present invention separates the process of adjusting the weight vector from the despreading process, carries out the adjustment in the weight vector in the chip-rate-based stage prior to the despreading, and adjusts the weight vector using the normalization and least mean square method, thereby get a faster convergence speed and a higher adjustment accuracy.

Figure 4:
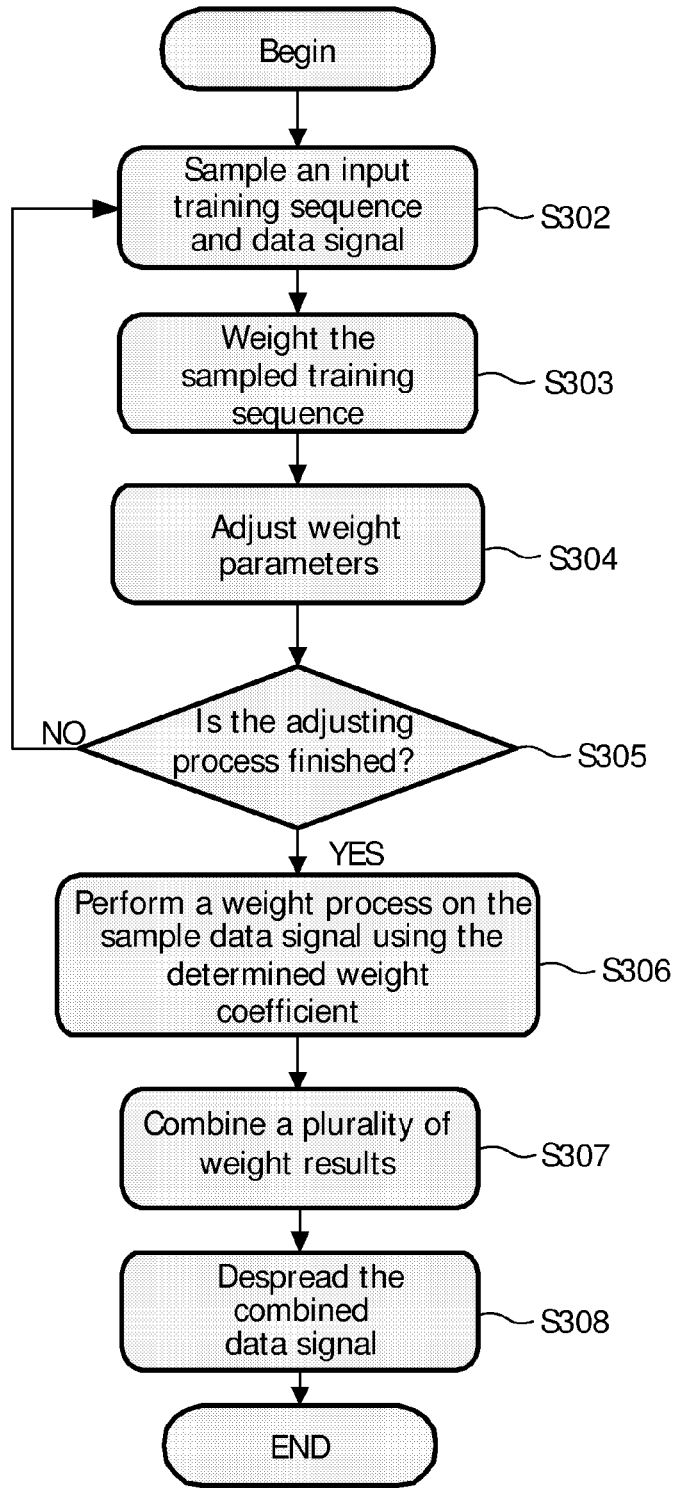
FIG. 4 illustrates a flow chart of a multi-user equalization method according to an embodiment of the present invention.

Referring to FIG. 4, the flow of operating the method of the present invention will be described from another aspect. As shown in FIG. 4, an input signal training sequence and data user data are over-sampled in step S302, for instance, each chip is sampled with i points. Then, a weight process is performed on the sampled training sequence in step S303, and the weight coefficient is adjusted by comparing the weighted training sequence with the known reference sequence in step S304. Next, whether the weight coefficient obtained in step S304 meets the predetermined condition or the training sequence used to train the weight coefficient is finished is decided in step S305; if the decision result is "yes", then it goes to step S306, otherwise it goes back to step S302 to implement the process of adjusting weight parameters from step S302 to step S305. After step S306, a weight process is performed on the sampled data signal using the determined weight coefficient. Afterwards, a combination process is performed on the received data signals using the determined weight coefficient in step S307, and the combined data signals are despread in step S308. And then, the whole process is finished.

Besides the embodiments provided above, many modifications could be made to the present invention. Although the technical solution of the present invention has been described with TD-SCDMA systems taken for example, it is obvious that the present invention can still be applied to other CDMA communication systems. A major feature of the present invention lies in the adjusting of each transmission path in the chip-rate-based stage prior to the despreading, rather than the adjusting of weight coefficients in the bit-rate-based stage. Thus, the present invention can be adapted to the case of rapid changes in transmission paths, especially to TDD systems.

Various alternations or modifications can be made without departing the concept and scope of the present invention. It is to be understood that the present invention is not limited to specific embodiments, and that the scope of the present invention is defined by the appended claims.

The invention claimed is:

1. An equalization device for a wireless communication receiver, comprising:
    a plurality of weighing means for respectively performing a weight process on a received multipath signal to obtain a plurality of weight results respectively according to a plurality of adjustable weight coefficients, wherein said multipath signal comprising a known training sequence and user data both experiencing channel fading;
    a plurality of adjusting means for comparing the plurality of weight results of said training sequence, which are output by said plurality of weighting means, with a plurality of known reference signals respectively, and respectively adjusting the weight coefficient of each weighting means by utilizing the comparison results so that said weighting means weight said user data by utilizing the adjusted weight coefficient; and
    a combining means for combining the plurality of weight results of said user data, which are output by said plurality of weighting means, to obtain a combined equalization signal.

2. The device as claimed in claim 1, further comprising a sampling means for performing a chip-rate-based over-sampling on said received signal and sending a sampled multipath signal obtained to each weighting means.

3. The device as claimed in claim 2, wherein said adjusting means determines whether to further adjust said weight coefficient by judging whether said comparison results meet expected results.

4. The device as claimed in claim 3, wherein said expected results are that a least mean square between the weight results of said training sequence and the known reference signals is smaller than a predetermined threshold.

5. The device as claimed in claim 3, wherein said weight coefficient is determined by said comparison results, said sample result and the current weight coefficient.

6. The device as claimed in claim 2, wherein said adjusting means obtains a weight coefficient adjusted for the $(m+1)^{th}$ time using the following equation:

$$W_{k,m+1} = W_{k,m} + 2\mu \frac{(c'_k[m] - c_k[m])^* X_m^{1/i}}{X_m^{1/iH} X_m^{-1/i}}$$

wherein $c_k[m]$ is a reference signal used for the $m^{th}$ adjustment by the $k^{th}$ adjusting means, i is a multiple of said over-sampling, $X_m^{1/I} = [X_1, X_2, \ldots, X_I]$ is sample results obtained by said sampling means, $W_{k,m}$ is a weight coefficient used for the $m^{th}$ adjustment by one of said plurality of adjusting means, $c_k'[m] = W_{k,m}^H X_m^{1/I}$ is weight results obtained through weight by said weighting means, and $\mu$ is a step for adjusting the weight coefficient.

7. The device as claimed in claim 1, wherein said known reference signals are signals based on the known training sequence and channel parameters.

8. The device as claimed in claim 1, wherein said adjusting means adjusts said weight coefficient of the training sequence chip by chip, in accordance with said comparison results.

9. An equalization method for use in a wireless communication receiver, comprising the steps of:
   a) performing a weight process on a known training sequence in received multipath signals experiencing channel fading to obtain a plurality of weight results of the training sequence respectively, according to a plurality of adjustable weight coefficients;
   b) comparing said plurality of weight results of said training sequence with a plurality of known reference signals respectively, and adjusting each of the weight coefficients in accordance with the comparison results respectively;
   c) performing a weight process on user data in said received multipath signal experiencing channel fading to obtain a plurality of weight results of the user data respectively, according to the plurality of weight coefficients obtained from adjustment; and
   d) combining said plurality of weight results of said user data to obtain a combined equalization signal.

10. The method as claimed in claim 9, further comprising a step of:
    e) performing a chip-rate-based over-sampling on the received signal and applying a multipath signal obtained from the sampling to a weight process.

11. The method as claimed in claim 10, wherein said step b) determines whether to further adjust said weight coefficient by deciding whether said comparison results meet expected results.

12. The method as claimed in claim 11, wherein said expected results are that a least mean square between the weight results of said training sequence and said known reference signals is smaller than a predetermined threshold.

13. The method as claimed in claim 11, wherein said weight coefficient is determined by said comparison results, said sample result and the current weight coefficient.

14. The method as claimed in claim 10, wherein said step b) obtains a weight coefficient adjusted for the $(m+1)^{th}$ time using the following equation:

$$W_{k,m+1} = W_{k,m} + 2\mu \frac{(c'_k[m] - c_k[m])^* X_m^{1/i}}{X_m^{1/iH} X_m^{-1/i}}$$

wherein $c_k[m]$ is a reference signal used for the $m^{th}$ adjustment by the $k^{th}$ adjusting means, i is a multiple of said over-sampling, $X_m^{1/I} = [X_1, X_2, \ldots, X_I]$ is sample results obtained by said sampling means, $W_{k,m}$ is a weight coefficient used for the $m^{th}$ adjustment by one of said plurality of adjusting means, $c_k'[m] = W_{k,m}^H X_m^{i/I}$ is weight results obtained through weight by said weighting means, and $\mu$ is a step for adjusting the weight coefficient.

15. The method as claimed in claim 9, wherein said known reference signals are signals based on the known training sequence and channel parameters.

16. The method as claimed in claim 9, wherein said step b) adjusts said weight coefficient of said training sequence chip by chip, in accordance with said comparison results.

17. A mobile terminal, comprising:
   a reception device for receiving a signal experiencing wireless channel fading;
   an equalization device for performing a chip-rate-based signal equalization on said received signal to obtain user data for use in despreading and equalization; and
   a despread device for despreading said equalized user data; and
   wherein said equalization device comprises:
      a plurality of weighing means for, according to a plurality of adjustable weight coefficients, respectively performing a weight process on a received multipath signal to obtain a plurality of weight results, said multipath signal including a known training sequence and user data experiencing channel fading;
      a plurality of adjusting means for comparing said plurality of weight results of said training sequence, which are output by said plurality of weighting means, with a plurality of known reference signals respectively, and respectively adjusting the weight coefficient of each of the weighting means in accordance with the comparison results so that said weighting means weights said user data by utilizing the adjusted weight coefficient; and
      combining means for combining the plurality of weight results of said user data, which are output by said plurality of weighting means, to obtain a combined equalization signal.

18. The mobile terminal as claimed in claim 17, wherein said known reference signals are signals based on the known training sequence and channel parameters.

19. The mobile terminal as claimed in claim 17, wherein said adjusting means determines whether to further adjust said weight coefficient by deciding whether said comparison results meet expected results.

* * * * *